(12) United States Patent
Aab et al.

(10) Patent No.: US 7,254,880 B2
(45) Date of Patent: Aug. 14, 2007

(54) ELECTROMECHANICAL DRIVE DEVICE AND METHOD FOR MANUFACTURE THEREOF

(75) Inventors: Volker Aab, Sesslach-Heiligersdorf (DE); Karl-Heinz Rosenthal, Karlsbad (DE); Reiner Kurzendoerfer, Coburg (DE); Herbert Becker, Coburg (DE); Gerhard Schelhorn, Coburg (DE)

(73) Assignee: Brose Fahrzeuqteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 10/258,296

(22) PCT Filed: Apr. 20, 2001

(86) PCT No.: PCT/DE01/01598

§ 371 (c)(1),
(2), (4) Date: Feb. 13, 2003

(87) PCT Pub. No.: WO01/82452

PCT Pub. Date: Nov. 1, 2001

(65) Prior Publication Data

US 2004/0027013 A1 Feb. 12, 2004

(30) Foreign Application Priority Data

Apr. 22, 2000 (DE) .............................. 100 20 017

(51) Int. Cl.
*H02K 15/00* (2006.01)
(52) U.S. Cl. .............................. 29/596; 29/868; 29/877; 29/881; 310/68 B; 310/68 R; 310/75 R; 310/83; 310/112; 318/10; 318/266; 318/466
(58) Field of Classification Search .................. 29/596, 29/868, 877, 881; 310/68 B, 68 R, 75 R, 310/83, 112; 318/10, 266, 466
See application file for complete search history.

(56) References Cited

U.S. PATENT DOCUMENTS 5,245,258 A * 9/1993 Becker et al. .............. 318/266

(Continued)

FOREIGN PATENT DOCUMENTS

DE 41 33 260 A1 4/1992

(Continued)

OTHER PUBLICATIONS

English translation of the IPER, dated Jul. 29, 2002 for International Application No. PCT/DE01/01598.

(Continued)

*Primary Examiner*—A. Dexter Tugbang
*Assistant Examiner*—Tim Phan
(74) *Attorney, Agent, or Firm*—Christie, Parker & Hale, LLP

(57) ABSTRACT

During the positioning of a control device for controlling an electromechanical drive, contact elements, which are connected to the control device in a fixed manner, are positioned in relation to one or more openings in a connector collar. To position the control device, the latter is displaced into a predetermined position. The predetermined position is defined, for example, by a guide or a stop. The contact elements are a component of an electric and/or optical junction which connects the drive device to other functional units, for example to a door control device or a motor vehicle battery. To position the contact elements in the connector collar of a connecting element which lies on the side of the drive device in the junction, the contact elements are positioned in relation to openings in the connector collar by being displaced together with the control device into the predetermined position. The positioning operation can be automated by a machine, for example by means of corresponding orientation indicators in the drive housing.

13 Claims, 3 Drawing Sheets

U.S. PATENT DOCUMENTS 5,528,093 A     6/1996   Adam et al.
5,613,881 A *   3/1997   Ichida et al. ................ 439/680
6,107,713 A *   8/2000   Hulsmann et al. ........ 310/75 R
6,317,332 B1 * 11/2001   Weber et al. ............... 361/760

FOREIGN PATENT DOCUMENTS

| DE | 195 48 866 A1 | 1/1997 |
| DE | 197 09 744 A1 | 9/1998 |
| DE | 198 39 333 C1 | 1/2000 |
| EP | 0 482 040 B1 | 4/1992 |
| EP | 0 538 495 B1 | 4/1993 |
| EP | 0618659 A1 | 10/1994 |

OTHER PUBLICATIONS

International Search Report of PCT/DE01/01598, dated Aug. 23, 2001.

International Preliminary Examination Report of PCT/DE01/01598, dated Jul. 29, 2002.

Definition of the term "CAST", http://dictionary.reference.com/search?q=casr; 6 pages.

* cited by examiner

ELECTROMECHANICAL DRIVE DEVICE AND METHOD FOR MANUFACTURE THEREOF

CROSS REFERENCE TO RELATED APPLICATION

This application is a National Phase Patent Application of International Application Number PCT/DE01/01598, filed on Apr. 20, 2001, which claims priority of German Patent Application Number 100 20 017.6, filed Apr. 22, 2000.

BACKGROUND

The invention relates to a method for manufacturing an electromechanical drive device for adjusting mechanisms of a motor vehicle, more particularly for a window lifter.

In order to raise and lower window panes of a vehicle, electro-motorized window lifters are known which are suitable for installation in motor vehicle doors and which have a drive device in the form of, for example, an electric motor with an attached gearing or gear motor which can be connected to a vehicle battery through a lead connection and a switch.

The window pane, which can be raised or lowered in the vehicle door through the electromotorized window lifter, is thereby fixed by its lower edge on a guide slide which can be moved up and down along a profiled rail by means of, for example, a closed cable loop. The cable loop loops around a cable drum which is driven, for example, through a worm gearing by the electric motor in a compact drive device which can have, in addition to the electric motor and worm gearing, the cable drum and which is fixed on the supporting parts of the inside of the vehicle door, for example, a support plate, like the profiled rail.

As an alternative to this, the drive device can be used to operate a cross arm window lifter or other adjusting devices of the vehicle, for example a length adjustment of a seat.

Since different forces are required for raising and lowering the window pane, the electric motor is connected to a control device, a control and regulating circuit which is connected to a sensor of a measuring system for determining the speed or position of the electric motor. The control device for raising or lowering the window pane is operated through an operating switch by the vehicle driver or passenger.

In DE 198 39 33 C1, a drive device is described for motor vehicles having separate housings for the gearing and the associated control electronics. The drawback with this drive device is that the modular construction requires additional assembly steps for making up the housing and that the plug connectors between the housings have to be additionally sealed from moisture.

From EP 0 482 040 B1 an electromechanical drive device is known in which a conventional plate with structural elements for a control and regulating electronics unit is mounted in a part of the gear housing. The insert module consists of the small plate, a side wall and a plug of a contact connection fixed on the plate. The insert module is provided with seals and is inserted until stopping in the part of the gear housing.

The drawback with this is the number of assembly steps required. First, the connector collar of the contact connection must be completed with contacts. Second, the connector collar is fixed in the side wall, and third, the connector contacts are soldered to the plate. In the fourth assembly stage, the side wall has to be provided with a circumferential seal, and in the fifth step, the insert module is inserted, aligned relative to the ring magnet, and then fixed.

SUMMARY

The object of the invention is to provide an electromechanical drive device which is simple to fit and to provide a method for manufacturing the electromechanical drive device which is sealed from dirt particles and fluids, such as for example moisture.

According to this the control device is positioned in the gear housing and the control device is pushed in for positioning through an insert opening in the gear housing. The connector collar is then fixed in or on the insert opening whereby the contact elements are inserted into the collar to complete the unit.

For insertion, the control device, for example a circuit substrate, leadframe or module housing of the control device, is guided in guide elements of the gear housing and is positioned, for example snap-fitted in the predetermined position. A particularly quick automated assembly of the control device can thereby be achieved.

The connector collar consists of at least an insulation material for example plastics which insulates the individual contact elements from each other. In addition other materials for example a metal sleeve for screening the signal leads can also be provided.

As an alternative for fixing the connector collar, the contact elements are cast with a sealing compound so that the insert opening together with the contact elements and sealing material form the connector element which is on the side of the drive device.

The contact elements inside the insert opening are fixed in position through the sealing compound individually or jointly. No additional elements are required for the drive side connector element. The edge of the insert opening is advantageously formed with elements for keyed connection with the connector element on the lead element side in order to increase the mechanical stability of the fitted lead connection.

With both methods according to the invention in order to position the control device, the control device is moved into a predetermined position. The predetermined position is, for example, fixed by a guide or a stop. By way of example, any play caused by possible manufacturing tolerances can be compensated by spring elements. Contact elements are fixedly connected to the control device. These contact elements serve to contact an electrical and/or optical junction which connects the drive device to other function units, for example a door control device or a vehicle battery. In order that the contact elements can be fixedly connected to the control device, metal contact elements can be soldered onto a plate of the control device for example, or the control device is integrated for example in a switch casing or so-called leadframe, and the contact elements are fixedly connected in the leadframe by casting. In order to postion the contact elements in the contact collar of a connecting element of the junction on the side of the drive device, the contact elements are positioned relative to openings of the contact collar by being displaced with the control device into the predetermined position. The connecting element of the junction on the side of the drive device is then completed at the same time or subsequently. The positioning can be carried out automatically by machine, for example, by corresponding orientation indicators in the gear housing.

The number of assembly steps is considerably reduced through various solutions according to the invention. A conventional plug element, its seals with the gear casing and the mechanical fixing and electric connection between the conventional plug element and control device are all unnecessary.

The electric motor has for example a motor shaft connected mechanically to the gear, coils for generating commutation and brushes for supplying current to the coils. The elements of the electric motor are disposed in a motor housing so that the electric motor can be prechecked as a function unit. The housing of the electric motor is fixed on the gear casing to make up the electromechanical drive device.

In one embodiment of the invention, the contact collar is connected with material bonding to the gear casing, in which for example the contact collar is welded ultrasonically to the edge area of the insert opening or the collar is stuck by an adhesive to the edge area around the insert opening. The contact collar can thus be sealed advantageously at the same time from the gear casing by the materially bonded fastening.

In order to seal the contact collar from particles of dirt and moisture in an advantageous embodiment of the invention the gear housing is cast by a sealing compound in the region of the contact collar. Sealing compounds which can be used for example for electric modules enables casting under low pressures. Thus in addition to the contact collar the control device can also be cast to seal with pressure-sensitive components such as for example an electrolytic capacitor. In addition to sealing, the cast is also advantageously used for fixing the contact collar or for the mechanical damping or fixing of the control device or other components.

In order to cast the sealing compound between the contact collar and the control device the contact collar advantageously has in addition at least one casting opening relative to the openings for the plug contacts. A cannula or the like is then temporarily inserted in the casting opening for the duration of casting in order to ensure a favourable distribution of the fluid or paste like sealing compound in the region of the contact collar.

In a particularly simple method of manufacture the contact elements are formed by conductor panels mounted on a region of a plate, with their end areas not cast by the sealing compound to allow for later contact connection. The structural elements connected on the plate are on the other hand advantageously cast with the sealing compound. The conductor panels are suitably adapted for different requirements. Thus conductor panels are made for a high current density through a stamped grid technique, or copper panels structured on the plate are widened out in cross-section for example through galvanic separation of metals. Signal leads are gold-plated for example for lower contact resistance.

BRIEF DESCRIPTION OF THE DRAWINGS

The invention will now be explained in further detail with reference to embodiments illustrated in the drawings in which:

FIG. 1aa shows a detailed view of the exploded view of FIG. 1a.

DETAILED DESCRIPTION

Figure 1:
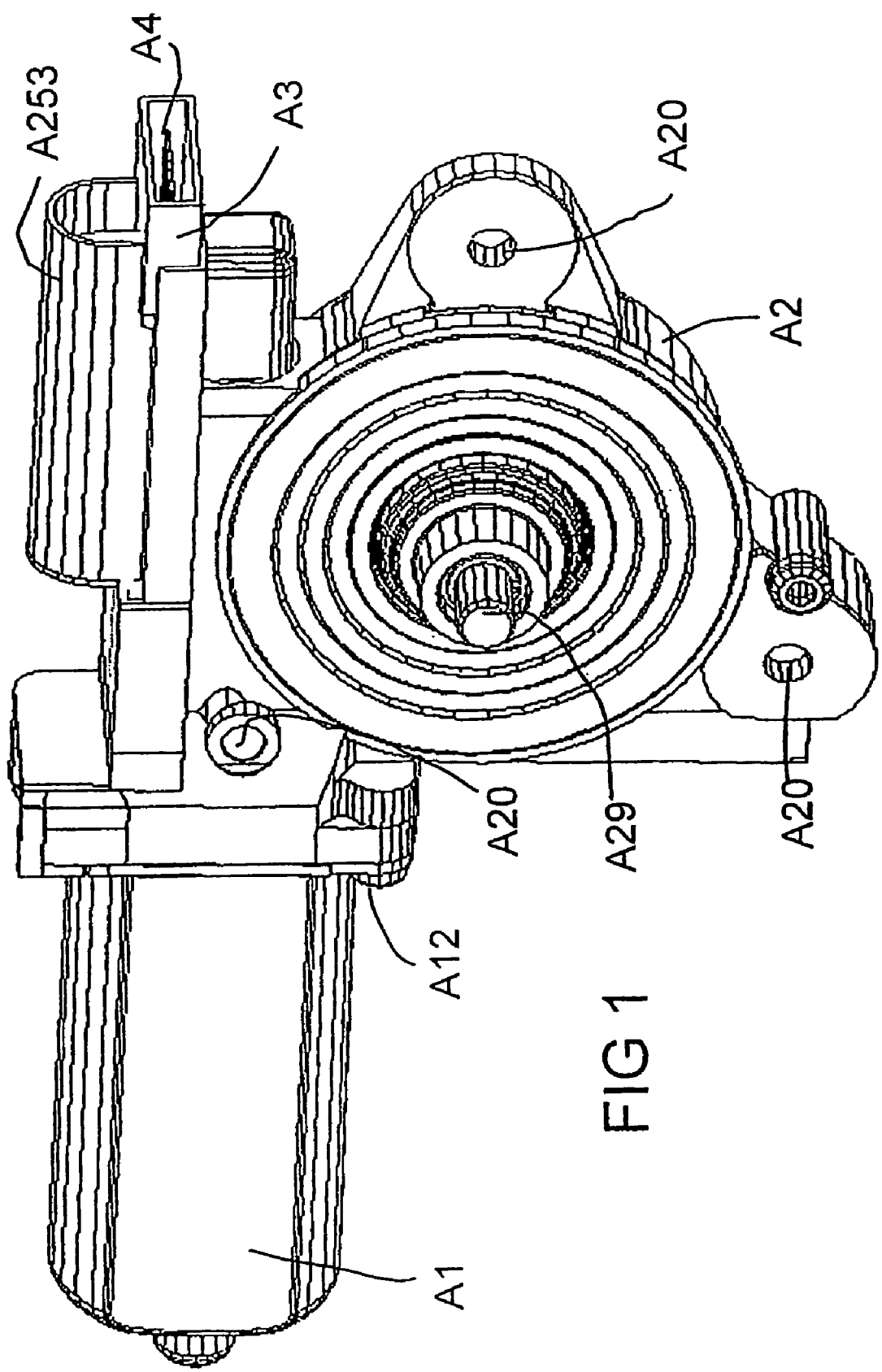
FIG. 1 shows an electromechanical drive device.

FIG. 1 shows an embodiment of an electromechanical drive device of a window lifter. An electric motor A1, here for example a commutator motor A1, is connected mechanically to a gearing. The housing of the electric motor A1 is fixed to the gear housing A2 through a screw connection A12 between the electric motor A1 and the gear housing A2. The gear housing A2 is in this embodiment an injection molded plastic housing, but a metal gear housing can be used as an alternative. The gear housing A2 has several screw-in points A20 through which the gear housing A2 is screwed onto a support plate (not shown in FIG. 1). A driven pinion A29 is guided through an opening in the support plate and a cable drum (likewise not shown in FIG. 1) is fixed on the pinion and drives a cable of a window lifter. Inside the gear housing A2 is a gearing, not shown in FIG. 1. The gearing consists for example of a worm connected to the axis of the electric motor A1 and driving a worm wheel which is connected to the driven pinion A29.

For controlling the electric motor A1, a control device A5 (shown by way of example in FIG. 1a) is integrated in the gear housing A2. The control device A5 is connected electrically or optically through a connecting element of a junction on the side of the drive device to further function units (not shown) of the vehicle, for example a door control device or a battery. The connecting element on the side of the drive device has at least one contact collar A3 and contact elements A4. The contact elements A4 are disposed inside the contact collar A3. The contact elements A4 are in this embodiment contact pins A4, but all suitable types of contact elements A4, such as for example contact springs, can be used here.

The contact collar A3 serves inter alia for the mechanical stability of the connection between the connecting element on the side of the drive device and the connecting element on the side of the junction (not shown in FIG. 1). By way of example the contact collar A3 is formed in one piece with the gear housing A2 by injection moulding the gear housing A2 with the contact collar A3. The contact elements A4, shown in FIG. 1 as contact pins A4, are inserted in the injection moulding tool and then the plastic of the contact collar A3 is injected around them.

Figure 1A:
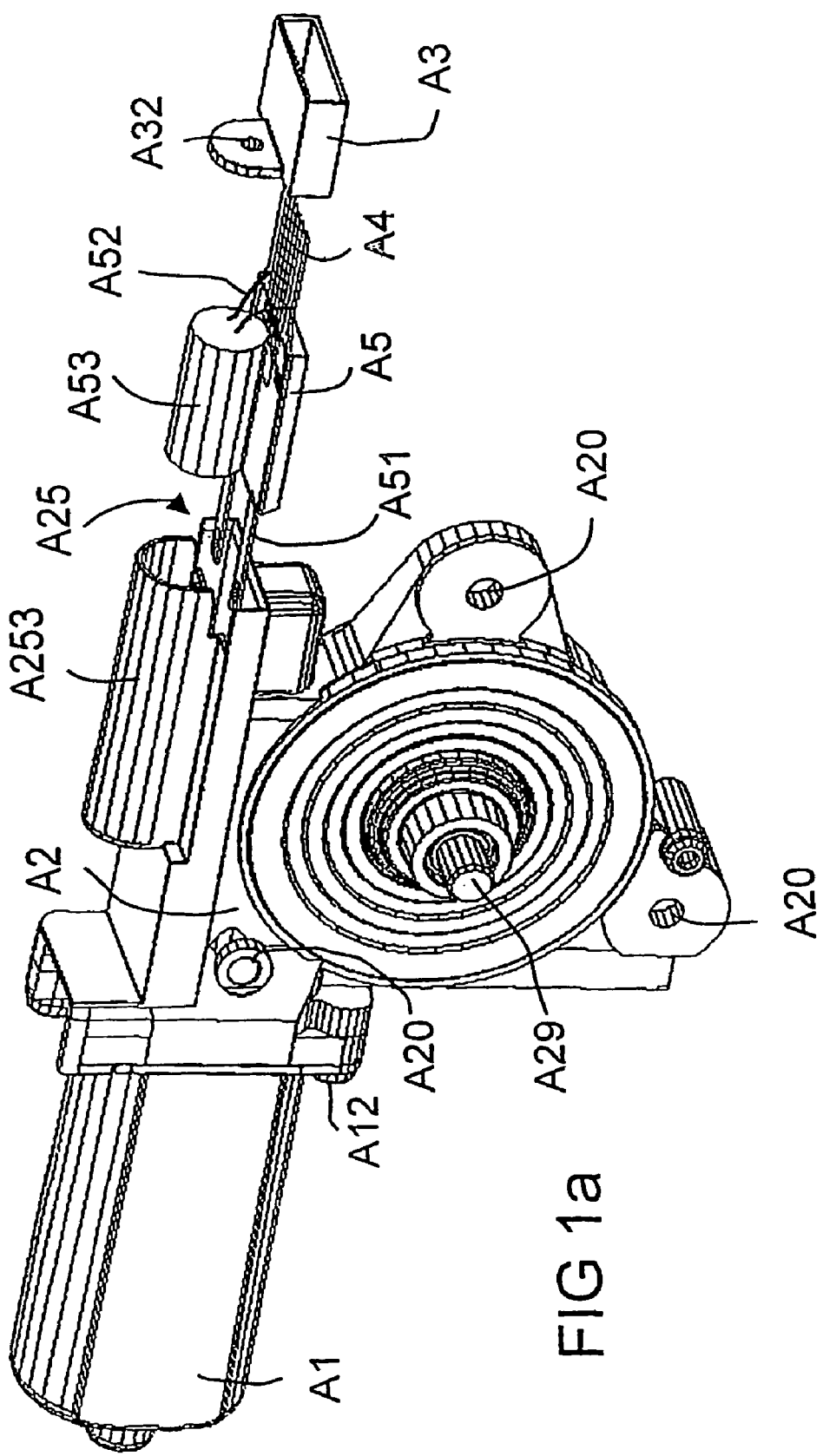
FIG. 1a shows an exploded view of a control device and a connecting element on the side of the drive device.
Figure 1A:
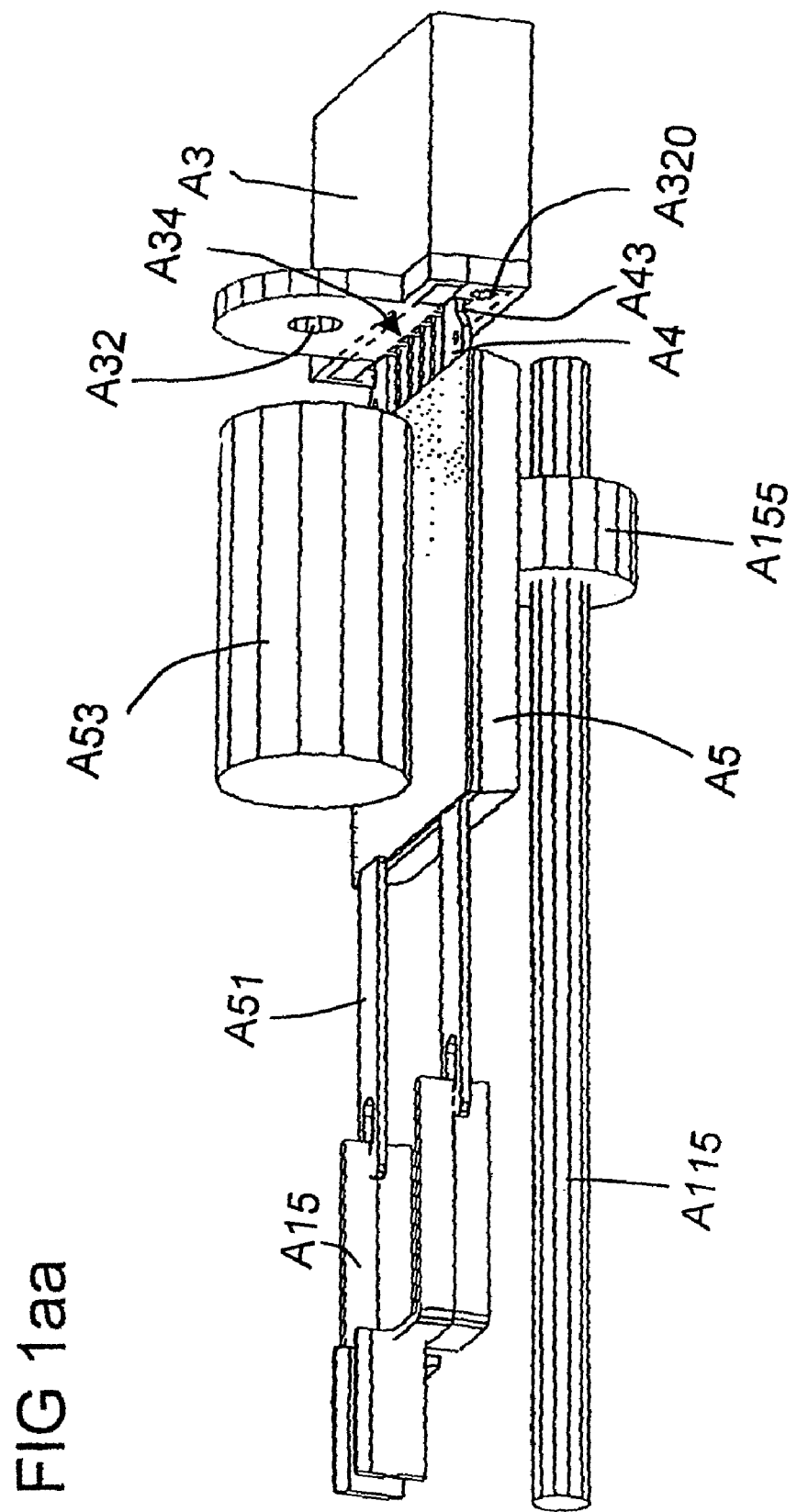

Electrolytic capacitors A53, shown by way of example in FIG. 1a, and pressure-sensitive components cannot be injected in the gear casing A2. These are disposed in FIG. 1 in a separate gear housing part A253. The housing A253 of the electrolytic capacitor A53 is fixed with material bonding on the gear housing A2 after the electrolytic capacitor A53 has been connected. The housing A253 of the electrolytic capacitor A53 has at the same time a second function, a cooling body for diverting the latent heat from the control device A5 and for this purpose is thermally coupled to the control device A5.

FIG. 1a shows in an exploded view a part of the electromechanical drive device. In this case the housing A253 of the electrolytic capacitor A53 is injection moulded in one piece on the gear housing A2. The electrolytic capacitor A53 is connected electrically to the control device A5 through the connecting elements and is inserted together with the control device A5 and the contact pins A4 fixedly connected thereto into the insert opening A25 for positioning. The motor contacts A51 of the control device A5 are connected to the electric motor A1 during positioning. After insertion the contact pins A4 are adjusted inside the insert opening A25. The adjustment may be carried out through guide elements (not shown in FIG. 1A) in the gear housing A2. The contact collar A3 is then inserted at least in part into the insert opening A25 whereby the contact pins A4 are guided through openings (A34, FIG. 1aa). The contact collar A3 has casting openings A32 into which a cannula (not shown) is inserted with a sealing compound.

FIG. 1aa shows a detailed view of the exploded view. A Hall magnet 155 is mounted on a worm shaft A115 positioned relative to the control device A5. The worm is not shown in FIG. 1aa. Two Hall sensors are integrated in the control device A5 to determine the position or movement of a window pane through the rotation of the Hall magnet A155. The control device A5 is contacted with the connectors A15 of the electric motor A1 through the motor contacts A51. For this purpose the ends of the motor contacts are designed as terminal contacts.

If the contact collar A3 is inserted in the insert opening A25 (FIG. 1a) then the positioned contact pins A4 are inserted in the associated openings A34 of the contact collar A3. The contact pins A4 engage in the contact collar A3 by detent connecting elements A43. Openings A320 in the contact collar A3 which are not in use can serve additionally to cast around the contact pins A4 with sealing compound, (not shown in FIG. 1aa).

The invention claimed is:

1. A method for manufacturing an electromechanical drive device for adjusting mechanisms in motor vehicles, wherein a gear is mounted in a gear housing and an electric motor is connected mechanically to the gear, comprising:
   positioning a control device for controlling the electric motor and at the same time positioning contact elements fixedly connected to the control device relative to one or more openings of a contact collar in order to make up a connecting element of a junction on a side of the drive device;
   positioning the control device in the gear housing by inserting the control device through an insert opening into a housing of the gear housing, said housing being integrally connected to the gear housing;
   inserting the contact collar at least in part into the insert opening, thereby inserting the contact elements in the contact collar; and
   fixing the contact collar to the insert opening of the housing, thereby enclosing the control device in said housing of the gear housing,
   wherein the fixing includes connecting the contact collar to the gear housing using material bonding or a keyed engagement.

2. The method according to claim 1 wherein inserting the control device includes electrically connecting the control device to the electric motor through connecting of motor contacts.

3. The method according to claim 1 wherein the gear housing is cast by a sealing compound in the region of the contact collar.

4. The method according to claim 3 wherein a fluid or paste like sealing compound is cast through an additional casting opening of the contact collar through a cannula.

5. The method according to claim 1 wherein fixing includes connecting the contact collar with material bonding to the gear housing by ultrasonic welding the contact collar to the edge region of the insert opening.

6. The method according to claim 1 wherein fixing includes connecting the contact collar with material bonding to the gear housing by sticking the contact collar to the edge area of the insert opening.

7. The method according to claim 1 wherein fixing includes connecting the contact collar to the gear housing through keyed engagement by clipping the contact collar in the insert opening.

8. A method for manufacturing an electromechanical drive device for adjusting mechanisms in motor vehicles, wherein a gear is mounted in a gear housing and an electric motor is connected mechanically to the gear, comprising:
   positioning a control device for controlling the electric motor and at the same time positioning contact elements fixedly connected to the control device relative to one or more openings of a contact collar in order to make up a connecting element of a junction on a side of the drive device;
   positioning the control device in the gear housing by inserting the control device through an insert opening into a housing of the gear housing, said housing being integrally connected to the gear housing; and
   casting the contact elements with a sealing compound, thereby sealing said housing of the gear housing and enclosing the control device in said housing so that the insert opening forms with the contact elements and the sealing compound the connecting element on the drive side.

9. A method according to claim 1 or claim 8 wherein the contact elements are formed by conductor panels mounted on an area of a small plate.

10. An electromechanical drive device made according to the method according to claims 1 or 8 wherein the contact collar is fixed as a separate part on the gear housing.

11. The electromechanical drive device according to claim 10, further comprising a seal mounted in a region of the contact collar for scaling the insert opening or the contact collar.

12. The electromechanical drive device according to claim 11 wherein the seal is formed by a sealing compound cast in the insert opening in the region of the contact collar.

13. The electromechanical drive device according to claim 11 wherein the seal is formed by a sealing element of a counter contact.

* * * * *

UNITED STATES PATENT AND TRADEMARK OFFICE
CERTIFICATE OF CORRECTION

PATENT NO. : 7,254,880 B2  Page 1 of 1
APPLICATION NO. : 10/258296
DATED : August 14, 2007
INVENTOR(S) : Volker Aab et al.

It is certified that error appears in the above-identified patent and that said Letters Patent is hereby corrected as shown below:

On the Title Page

(57) Abstract, line 10           After "example", insert --,--

(57) Abstract, line 17           After "example", insert --,--

In the Claims

Column 6, line 31, claim 8       After "compound", insert --is--

Column 6, line 41, claim 11      Delete "scaling"
                                 Insert --sealing--

Signed and Sealed this

Seventeenth Day of June, 2008

JON W. DUDAS
*Director of the United States Patent and Trademark Office*